United States Patent Office 3,107,259
Patented Oct. 15, 1963

3,107,259
HIGH MOLECULAR METAL COMPLEXES
Gerold Schwarzenbach, Zurich, Switzerland, assignor to J. R. Geigy A.-G., Basel, Switzerland
No Drawing. Filed June 2, 1960, Ser. No. 33,405
Claims priority, application Switzerland June 3, 1959
7 Claims. (Cl. 260—429.2)

Aminopolycarboxylic acids such as nitrilotriacetic acid form with most of the metal ion 1:1 complexes, so-called chelates. It is a known fact that many of these complexes can contain further co-ordinated groupings whether they be at unoccupied co-ordination positions of the central atom or by opening one or more of the chelate rings present. The nitrilotriacetic acid complexes have a particular tendency to such reactions as these complex formers can only occupy four co-ordination positions of one metal ion. Thus, with excess nitrilotriacetic acid, they frequently form 2:1 complexes, i.e. chelates, which contain 2 mols of nitrilotriacetic acid per metal ion. But the 1:1 complexes can also co-ordinate other complex formers while forming so-called mononuclear mixed complexes, i.e. complexes the anion of which, in addition to the central metal ion and the nitrilotriacetate ion, also contains other co-ordinated groupings. Thus, for example, iron (III) complexes are known which have the composition NaFeRX (R=nitrilotriacetate anion, X=hydroxyl ion or acetate ion). Further, it is known that such mononuclear mixed complexes, in particular the hydroxo complexes, can associate to form polynuclear aggregates. In the case of hydroxo complexes, in which the connection is by way of $\mu$-OH, dimers and trimers, i.e. low telomers, have been observed. Further polymerisation leads to the known precipitations analogous to the basic salts which contain metal hydroxide and complex former.

Surprisingly however, the 1:1 complexes of trivalent cations of certain earth metals, i.e. the rare earth metals of the atomic numbers 57 up to and including 71 as well as yttrium (atom number 39) react anomalously upon the addition of lyes as they form neither the expected mononuclear mixed complexes, nor telomers thereof nor the polynuclear insoluble precipitations mentioned above, but form highly viscous solutions containing high polymers.

The simple 1:1 complexes of the earth metals to be used as defined with nitrilotriacetic acid are known as such and, due to the compensation of the charge of the two complex partners, are electro-neutral complex molecules, i.e. they are inner complex salts as referred to by H. Ley. Generally, the solubility of these complexes is limited in water and they can be easily crystallised in a pure form although they have a marked tendency to form supersaturated solutions. If such pure 1:1 complexes are suspended in water or in mixtures thereof with organic solvents, and alkali lye is slowly added with good agitation, they begin to dissolve while forming highly viscous solutions. If, however, too much alkali lye is added, i.e. more than 1.5 formula weight per formula weight of earth metal, then the known metal hydroxides containing complex former precipitate. By formula weight throughout this specification and claims is meant the sum of the atomic weights of the elements given in the empiric formula. Thus, the formula weights include also the molecular weights, atomic weights and group weights of ions and radicals. Thus, e.g. the formula weight of $Y^{3+}$ is 88.92; therefore a solution containing 8.892 g. yttrium in any form dissolved therein, contains $\frac{1}{10}$ formula weight of yttrium. To produce the high molecular complexes, 0.8 to 1.5 formula weight of alkali lye per formula weight earth metal are necessary, 0.9 to 1.3 equivalents being preferred. Alkali lyes suitable for this polymerisation process are the solutions of lithium, sodium, potassium, rubidium and caesium hydroxides.

The subjects of the present invention are, therefore, high molecular metal complexes obtained by adding alkali hydroxide to the 1:1 complex of nitrilotriacetic acid with a trivalent cation of an earth metal selected from the group consisting of yttrium and the rare earth metals of the atomic numbers 57–71 in a ratio of 0.8 to 1.5 formula weight of alkali hydroxide per formula weight earth metal.

It has further been found that it is not necessary to start with the pure and isolated 1:1 complexes of nitrilotriacetic acid with the earth metals as defined but that supersaturated solutions of these complexes produced by mixing solutions of the complex partners in a manner known per se can also be used for the production of solutions of the polymeric complexes. An exact equivalency between the earth metal as defined and the nitrilotriacetic acid is not absolutely necessary in this case. Tests have shown that an excess over the theoretical of up to 50 mol percent of the nitrilotriacetic acid necesary for the preparation of 1:1 complexes has no disadvantageous effect. However, in some cases it is often advantageous if the amount of complex former is better adapted to the amount of the earth metal salt as otherwise only telomers are formed. On the other hand, an excess of up to 40 mol percent of earth metal as defined may be used but in this case gelatinous solutions are formed. The neutral salts often formed in this process such as, e.g. sodium chloride, potassium nitrate, sodium acetate, naturally remain in the high viscous solution of the polymers and must be removed, if necessary, by dialysis.

On further working on the process it has been found that on adding salts of polyvalent cations to the highly viscous solutions of the polymeric metal complexes according to the invention, they generally solidify into gels which, in certain concentrations are markedly thixotropic. Salts of all polyvalent cations which with nitrilotriacetic acid form complexes which are less stable than or at most as stable as those of the earth metal forming the basis of the polymer, are suitable as such gelling agents. Such metals can be chosen from the list of stability constants published in "Stability Constants of Metal Ion Complexes, With Solubility Products of Inorganic Substances," compiled by Jannik Bjerrum, Gerold Schwarzenbach and Lars Gunnar Sillén, part I, special publication No. 6., The Chemical Society, London, Burlington House, W. 1, 1957. In particular the earth alkali metals and the earth metals themselves which are the bases of the polymers can be used. These metals can be reacted in the form of their simple soluble salts such as the mineral acid salts and in the form of the simple salts of organic acids such as, e.g. acetic acid. The usual marketed chlorides, nitrates, perchlorates, sulphates (insofar as they are water soluble), acetates, formates etc. are particularly suitable.

These gel-forming, non-complex metal additives, in the following termed auxiliary metals, do not have to be incorporated into the highly viscous solutions after polymerisation but can be added to the starting solutions containing monomers whereupon, on the addition of the lye, the gelatinous stage is reached immediately.

The amount of these auxiliary metals depends on the degree of gelation to be attained. The greater the amount of auxiliary metal present, the thicker is the gel obtained. If the amounts of auxiliary metal are too great, however, precipitations occur whilst the gels separate into two phases. The tolerable limit is generally attained at about 40 mol percent of auxiliary metal to complexed metal;

the exact limit can easily be determined in individual cases by preliminary trials.

The high molecular complexes can be isolated, in the form of glass-like substances which can be pulverised, from the solutions produced according to the invention, by carefully removing the solvent in vacuo, by freeze-drying or other mild drying methods. On redissolving the pulverulent polymers, highly viscous solutions or gels are again formed which, if the drying operation has been conducted carefully, correspond to a great extent to the starting solutions.

It is also possible to react simultaneously two or more of the earth metals used as defined to form a copolymer. In the same way, more than one auxiliary metal can be used to attain special properties in the desired gel.

The structure of the high polymeric complexes has not been completely elucidated, but on the addition of alkali lyes, probably chain-form structures of the type

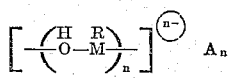

R = nitrilotriacetate ion,
M = trivalent cation of the earth metals as defined,
$n = >10$,
A = alkali metal cation, are formed from the 1:1 complexes. The solutions thereof have the known properties of solutions of linear high polymers, in particular, high viscosity and streaming birefringence. It is interesting that the viscosity of these metal-containing linear polymers only slightly depends on the temperature so that these solutions, in contrast to gelatine solutions, remain highly viscous also at the boiling point of their aqueous solutions.

The addition of auxiliary metals causes a certain cross linking of the original chains to gelatinous structures exactly in the same way as a weak cross linking of organic linear high polymers leads to gel. Obviously, the auxiliary metal must not form more stable complexes with nitrilotriacetic acid than the earth metals as defined which form the "backbone" of the linear polymer as otherwise a depolymerisation occurs with the formation of mononuclear complexes of the auxiliary metals.

The solutions of the polymeric metal complexes according to the invention can be used for the production of ointments and pastes which serve as general thickeners. Also, because of their content of earth metals as defined, they can be used for protection against high energy radiation such as is caused, for example, in nuclear reactions in the form of cosmetic protecting agents or for impregnating protective clothing.

The following examples only serve to illustrate the invention and do not limit it in any way. The temperatures are given in degrees centigrade.

Example 1

3.31 g. (0.01 formula weight) of 1:1 complex of nitrilotriacetic acid with yttrium of the composition $YR.3H_2O$ (R = anion of nitrilotriacetic acid) are suspended in 15 ml. of water at 60° and 100 ml. (0.01 formula weight) of 0.1 N-sodium hydroxide are added dropwise. The reaction mixture is heated to 100° under continuous stirring whereby the inner complex salt slowly dissolves and a water-clear, highly viscous solution is formed. This solution is so viscous that it will not flow through an ordinary viscosimeter. Samples of this solution are rolled for 1 day in a powder bottle with the amount of water given below and the relative viscosity $\mu$ of the solutions obtained is tested.

| Dilution: | $\mu$ relative |
|---|---|
| 1:4 | 1556 |
| 1:10 | 6.21 |
| 1:20 | 2.89 |
| 1:40 | 1.25 |

These solutions are also very strongly birefringent in the streaming state. The influence of the temperature and of the neutral salts on the viscosity is very slight. On adding sodium chloride to the solution diluted to 1:40, the following viscosities were found.

| Percent sodium chloride: | $\mu$ relative |
|---|---|
| 0 | 1.25 |
| 0.005 | 1.21 |
| 0.01 | 1.25 |
| 0.02 | 1.33 |

Example 2

0.1932 g. (0.0005 formula weight) of neodymium complex of the composition $NdR.3H_2O$ (R = anion of nitrilotriacetic acid) are suspended in 5 ml. of water of 50° and 5 ml. of 0.1 N-potassium hydroxide are slowly added while stirring well and the mixture formed is digested for half an hour on a water bath. After making up to 50 ml., a clear highly viscous solution is obtained after some time.

Similar results are obtained in a 50:50 water/ethylene glycol mixture.

Polymeric complexes of lanthanum, praseodymium and gadolinium are produced in an analogous manner. In the case of cerium, disturbances easily occur as complexed cerium oxidises very easily and, upon exposure to air, the cerium is oxidised to the tetravalent state which cannot form such polymers.

Example 3

15 ml. of 0.1 molar trisodium nitriloacetate solution are added to 10 ml. of 0.1 molar yttrium chloride solution, and the resultant supersaturated solution of the 1:1 complex formed, which contains 50% excess sodium salt of the complex former, is heated to 55°. 30 ml. of 0.1 N-lithium hydroxide solution are then added dropwise with good agitation. On working up as described in Example 1, a viscous solution of the polymeric complex is obtained.

Example 4

1.5 g. of $YR.3H_2O$ and 1.5 g. of $NdR.3H_2O$ (R = anion of nitrilotriacetic acid) are suspended in 12 ml. of water and the suspension is polymerised as described in Example 1 with 90 ml. of 0.1 N-sodium hydroxide. A clear, highly viscous solution of the copolymer is obtained.

Example 5

To the solution of the neodymium polymer according to Example 2, 8% of neodyminum, calculated on the neodymium content of the solution, is added carefully in the form of its chloride solution. After rolling in a powder bottle for two days, a very stiff gel is obtained.

Example 6

0.1932 g. (0.0005 formula weight) of the neodymium complex according to Example 2 are suspended at 50° in 5 ml. of water and 5 ml. of 0.1 N-caesium hydroxide solution are added dropwise with good agitation. The mixture formed is heated for half an hour at 90.95° and the volume is then made up to 50 ml. After adding 1 ml. of 0.1-molar calcium chloride solution it is rolled in a powder bottle for three days whereupon a stiff gel is obtained.

Similar results are obtained if, instead of calcium chloride, strontium nitrate is used.

What I claim is:

1. A process for the production of a high molecular metal complex which comprises adding to an aqueous solution which contains the 1:1 complex of nitrilotriacetic acid with a trivalent cation of an earth metal selected from the group consisting of yttrium and the rare earth metals of the atomic numbers 57–71, 0.8 to 1.5 formula weight of alkali hydroxide per formula weight of earth metal.

2. A process according to claim 1, wherein there is an up to 50 mol percent excess of nitrilotriacetic acid in the form of its alkali metal salt in addition to the 1:1 complex.

3. A process according to claim 1, wherein in addition to the 1:1 complex of nitrilotriacetic acid with a trivalent cation, there is present a second polyvalent metal in the form of one of its soluble salts, the amount of this metal being not more than 40 mol. percent of the earth metal in complex linkage, said second polyvalent metal being a polyvalent metal which forms a complex with the nitrilotriacetic acid which complex is at most as stable as that formed with said trivalent cation.

4. A high molecular metal complex obtained by adding alkali hydroxide to an aqueous solution containing the 1:1 complex of nitrilotriacetic acid with a trivalent cation of an earth metal selected from the group consisting of yttrium and the rare earth metals of the atomic numbers 57–71 in a ratio of 0.8 to 1.5 formula weight of alkali hydroxide per formula weight of earth metal.

5. A high molecular metal complex obtained by adding sodium hydroxide to an aqueous solution containing the 1:1 complex of nitrilotriacetic acid with the trivalent cation of yttrium in a ratio of one formula weight of sodium hydroxide per formula weight of yttrium.

6. A high molecular metal complex obtained by adding potassium hydroxide to an aqueous solution containing the 1:1 complex of nitrilotriacetic acid with the trivalent cation of neodymium in a ratio of one formula weight of potassium hydroxide per formula weight of neodymium.

7. A process for the production of a high molecular metal complex which comprises adding to an aqueous medium which contains the 1:1 complex of nitrilotriacetic acid with a trivalent cation of an earth metal selected from the group consisting of yttrium and the rare earth metals of the atomic numbers 57–71, 0.8 to 1.5 formula weight of alkali hydroxide per formula weight of earth metal.

References Cited in the file of this patent
UNITED STATES PATENTS 2,583,891    Schwarzenbach _____ Jan. 29, 1952

OTHER REFERENCES

Martell et al.: "Chemistry of the Chelate Compounds," pp. 39–46, 156, 158, 192–197, 468, 469, 479–481 (1952).

Hart et al.: "J. of Laboratory and Clinical Medicine," vol. 46, #2, pp. 182–192, August 1955.

Wolfe et al.: "Chem. Techn." vol. 10, pp. 290–296, May 5, 1958.